Jan. 22, 1957   G. T. GADDIS   2,778,571
TEMPERATURE CONTROL WITH NIGHT SET-BACK
Filed Oct. 5, 1953
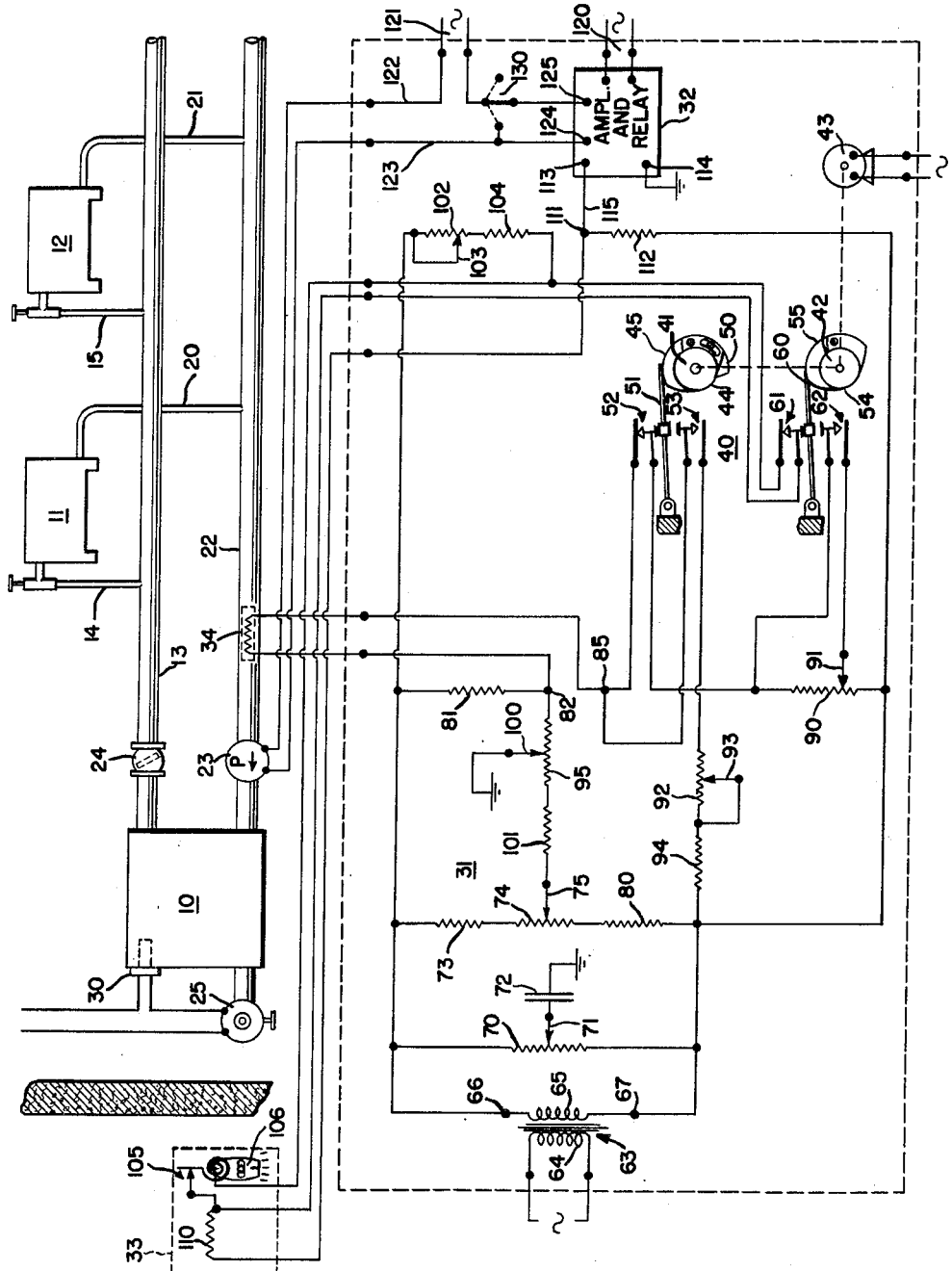
INVENTOR.
GENE T. GADDIS
BY George H Fisher
ATTORNEY

United States Patent Office 2,778,571
Patented Jan. 22, 1957

2,778,571

TEMPERATURE CONTROL WITH NIGHT SET-BACK

Gene T. Gaddis, Edina, Minn., assignor to Minneapolis-Honeywell Regulator Company, Minneapolis, Minn., a corporation of Delaware Application October 5, 1953, Serial No. 384,122

11 Claims. (Cl. 236—46)

The present invention relates to an improved temperature control apparatus.

It is common practice to control a heating system to maintain one room temperature during the day and a second lower temperature during the night. Upon the return to the day temperature, a high heat input is necessary for a predetermined period of time to raise the temperature. The above operations are commonly known as "night set-back" and "morning pickup." Usually the control is effected by a room thermostat; however, in some applications room thermostats are replaced by an outdoor controller especially where some difficulty arises in finding a representative room.

During mild weather there is a tendency for an installation using an outside controller to overheat upon the operation of "morning pickup" and also it is sometimes desirable to be able to have no operation of the heating installation at night when the outdoor temperature is above a certain value.

In the present invention, the temperature of the heating medium is varied inversely with variations in outdoor temperature, night set-back is effected by lowering the temperature of the medium to a selected value, and morning pick-up is effected by increasing the temperature of the heating medium to a selected value for a predetermined period of time; however, during the period of night set-back and morning pick-up the heating system can be shut down should the outdoor temperature be above a predetermined value. The selective shutdown is effected by a pair of parallel connected switches, one being operated in response to a selected outdoor temperature and a second being operated by a timer motor.

It is an object of the present invention to provide a control apparatus wherein night and pick-up operations can be shut down when the controlling condition exceeds a predetermined value.

It is a further object of the present invention to provide a control apparatus for a heating system in which the authority of a plurality of controllers is effected by the outdoor temperature during a selected period of operation.

These and other objects will become apparent upon the study of the following specification and drawing wherein:

A single figure is a schematic view of the present invention as applied to a hot water heating system.

In the system of the figure a boiler 10 supplies hot water to radiators 11 and 12 through a supply main 13 and input risers 14 and 15. Water is returned from the radiators through return risers 20 and 21 connected to a return main 22. A circulating pump 23 is connected in return main 22 for circulating the water through the heating system. A weighted or flow valve 24 prevents circulation due to thermo-siphon action and opens only upon operation of pump 23. The boiler water temperature is maintained at a predetermined value by a burner 25 connected to a control unit 30.

The heating plant is controlled in response to the output of a bridge network circuit 31 connected in controlling relation to an amplifier and relay 32 which controls the operation of pump 23. While relay 32 is shown to control the operation of pump 23 in a hot water heating system obviously relay 32 can control any sort of temperature changing apparatus, for example, the burner in a hot water system having continuous water ciculation or a steam valve in a steam heating system. Bridge network circuit 31 comprises an outdoor unit 33 and an indoor temperature responsive resistance element or unit 34 located in return main 22 and responsive to the temperature of the return water.

To provide for night set-back and morning pickup a cam operated switch mechanism 40 is provided. While the switch mechanism as shown provides a desired sequence of operation, it should be understood that any other suitable switch mechanism may be used with the invention. Cams 41 and 42 are connected to a motor 43 energized by a source of power and providing for rotation of the cams at the rate of one revolution every 24 hours. Cam 41 has a night portion 44, a higher day portion 45, and an adjustable portion 50 for morning pick-up. A follower 51 closes switch 52 when riding on the high portion and closes switch 53 when riding on the low portion. Cam 42 has a low portion 54 and a higher day portion 55. A follower 60 closes switch 61 when riding on the high portion and closes switch 62 when riding on the lower portion. Both day portions 45 and 55 can be adjusted for a desired portion of the total 24 hours, or one revolution.

More specifically bridge network circuit 31 comprises a transformer 63 having a primary winding 64 connected to a source of power and a secondary winding 65 having terminals 66 and 67. Several parallel branch circuits are connected between the terminals, a first branch including a resistor 70 having a movable wiper 71 that is connected through a capacitor 72 to ground. A second branch includes a resistor 73, a resistor 74 having a movable tap 75, and a resistor 80. A third branch includes a resistor 81, a tap 82, element 34, a tap 85, switch 52, a resistor 90 having a movable tap 91 thereon. Resistor 81 has a very low temperature coefficient of resistance to eliminate ambient temperature effects on the bridge output. Switch 62 is connected between one extremity of resistor 90 and movable tap 91 so that a portion of resistor 90 can be shortened out when switch 62 is closed. Tap 85 is connected to terminal 67 through a circuit including: switch 53, a resistor 92 having a movable tap 93 thereon for shorting out a portion of the resistor, and a resistor 94. Tap 82 is connected to wiper 75 through a circuit including: a resistor 95 and a resistor 101, resistor 95 has a movable tap 100 connected to amplifier. A fourth branch includes a resistor 102 having a movable tap 103 for shorting out a portion of the resistor, a resistor 104, control unit 33 comprising a thermally operated switch 105 and a temperature responsive resistance element 110 connected in series, a tap 111 connected to ground and a resistor 112. Switch 61 is connected in parallel with thermally operated switch 105; switch 105 is provided with an adjustment lever 106 for calibrating the switch for operation at a temperature between 40 and 70 degrees Fahrenheit.

Amplifier and relay 32 is preferably of a sort similar to the amplifier and relay disclosed in the copending patent application of George F. Jenkins Serial No. 378,196, filed September 3, 1953, having input terminals 113 and 114 of which terminal 113 is connected to tap 111 by a conductor 115 and terminal 114 is connected to ground, obviously, any other suitable relay device may be used for 32. Amplifier and relay 32 is connected to a source of power 120. Pump 23 is connected to a source of power 121 through a circuit including: source 121, a conductor 122, pump 23, a conductor 123, an output terminal 124 of relay 32, output terminal 125, switch 130, and to the other side of source 121. Switch 130 can be positioned in one of three positions providing for no operation of pump 23, continuous operation of the pump, and automatic operation of the pump by amplifier and relay 32.

Adjustment of wiper 71 provides for capacitance balance of network circuit 31 depending on the length of the conductors used to connect control units 33 and 34 to network circuit 31. Wiper 75 is for calibration of network circuit 31 and is usually done at the factory. Wiper 100 provides for the adjustment of "full heat" and establishes that temperature at which outdoor unit 33 must be exposed to in order to maintain a specified water temperature (200°) at element 34. With the values of circuit components shown in the table, hereafter, adjustment of wiper 100 from one end to the other provides for a range from 35 to —80° F. of outdoor temperature for "full heat" operation. Wiper 103 provides for "no heat" adjustment which is that temperature to which the outdoor unit 33 is exposed to render the circulator 23 inoperative. Movement of wiper 103 from its extreme positions provides a range of "no heat" from 50 to 80° F. outdoor temperature. Wiper 91 provides for the adjustment of "morning pick-up" and establishes that temperature at which the heating system will operate for a given outdoor temperature during the period when cam follower 51 is riding on the high portion 50 of cam 41. Wiper 93 provides for "night set-back" and as apparent is only connected in the network circuit when follower 51 is riding on low portion 44 of cam 41. Movement of either wiper 91 or 93 through its extreme range provides for a temperature change of 80° in the return water as sensed by element 34.

*Table of values*

| Unit: | Values |
|---|---|
| Resistance 70 | K (ohms) 50 |
| Resistance 73 | K 1 |
| Resistance 74 | 40 |
| Resistance 80 | K 1 |
| Resistance 81 | 610 |
| Resistance 90 | 100 |
| Resistance 92 | 100 |
| Resistance 94 | 100 |
| Resistance 102 | 36 |
| Resistance 104 | 164 |
| Resistance 112 | 504 |
| Resistance 95 | K 10 |
| Resistance 101 | K 2.7 |
| Element 83 | 500 |
| Element 105 | 325 |

| Transformer output: | Voltage |
|---|---|
| 66 to 67 | volts 12 |

*Operation*

With the apparatus as arranged in the figure, the return water temperature as sensed by element 34 is maintained at a predetermined temperature dependent upon the temperature of outdoor element 110. Should the outdoor temperature drop, an unbalance of bridge network circuit 31 causes amplifier relay 32 to energize pump 23 and begin circulation of hot water through the heating system. Should the boiler water temperature fall, control unit 30 will sense the fall and energize burner 25, the boiler water temperature thus being maintained at a predetermined level. As the return water temperature increases, control network 31 again becomes balanced and circulator pump 23 will be deenergized. A similar operation exists upon a fall in the water temperature; network circuit 31 is unbalanced, and circulator 23 is operated to maintain a predetermined level of heating by radiators 11 and 12.

As long as the outdoor temperature is below a predetermined value as selected by lever 106, switch 105 remains closed and operation of network circuit 31 controls in response to elements 110 and 34. As cams 41 and 42 are rotated clockwise, followers 51 and 60 approach and reach the lower portions 44 and 54 of the cam to close switches 53 and 62 and open switches 52 and 61. Operation of switch 53 places resistors 92 and 94 in the circuit to change the previous relation between elements 110 and 34, in a manner to maintain a lower water temperature in the heating plant for a given outdoor temperature. As long as followers 51 and 60 are riding on lower portions 44 and 54 of the cams the heating plant is being operated under "night setback" conditions with a consequently reduced temperature in the building, as selected by the position of wiper 93.

Before the restoration of the heating system to the day control it is necessary that the temperature of the building be reestablished. With the arrival of morning, as follower 51 rises on high portion 50, switch 52 will introduce resistor 90 into the network circuit to again change the relation between the elements 110 and 34. During this "morning pickup" period the water temperature in the heating plant is maintained at a temperature higher than normally maintained during the daytime operation for a given outdoor temperature; however, a selected period of time after follower 51 rises on high portion 50, follower 60 rises on high portion 55 and switch 62 opens to return network circuit 31 to the daytime control.

During mild weather it is often desirable to shut down the heating system during the night and also prevent "morning pickup." By the adjustment of thermally operated switch 105 it can be made to open at some predetermined outdoor temperature above which there is no need of operation of the heating installation during night or setback operation. Switch 61 is connected in parallel with switch 105 so that during the period when follower 60 is riding on the daytime or high portion 55, switch 105 cannot render the heating system ineffective; however, when switch 61 opens as follower 60 rides on the lower night time portion 54, the switch 105 has authority to prevent operation of the heating system during the night and during "morning pickup" should the outside temperature be above that at which no operation is desired.

As previously mentioned when the outdoor temperature increases the resistance of outdoor element 110 increases to require a lower water temperature in main 22 which requires less operation of pump 23 and burner 25. When switch 105 is open upon the outdoor temperature exceeding a predetermined value, switch 61 being open, the resistance in the bridge leg containing element 110 has approached infinity, this being similar to an extremely high outdoor temperature will render pump 23 ineffective and shut down the heating system.

In many apartment or office buildings during mild weather, commonly above 45 degrees Fahrenheit, a desired degree of comfort is maintained during the daytime even when the heating system is turned off at night and no morning pickup is used. To operate a heating system at night when the outdoor temperature is above 45 degrees often causes an excessive temperature in the building not only at night but also the following day, this being especially objectionable in the light of both economics and comfort. Switch 105 automatically controls the night operation to provide a desired degree of comfort in the heated zone as well as preventing operation of the heating system when not needed.

It would be obvious to one skilled in the art that a control unit such as 33 could be used with apparatus for controlling a heating installation of some sort such as forced warm air in which unit 34 could be responsive to the return air temperature or room temperature. Other substitutions will be obvious to one skilled in the art, therefore the present invention should be determined only by the scope of the appended claims.

I claim:

1. In temperature control apparatus, control means for controlling temperature changing apparatus; network circuit means for controlling said control means, said network circuit comprising a pair of power input terminals and a plurality of parallel branches connected between said terminals; a first branch including a resistance element having a movable tap thereon; a second branch including a tap and temperature responsive resistance means responsive to the effectiveness of said temperature changing apparatus; and a third branch including an output terminal, temperature responsive switch means, time responsive switch means, and outdoor temperature responsive resistance means; connection means including a second output terminal connecting said movable tap and said tap; and further connection means connecting said output terminals to said control means, said first mentioned switch means rendering said controlling means inoperative during selected periods when a condition indicative of a need of operation of said temperature changing apparatus is above a predetermined value.

2. In temperature control apparatus, means for controlling temperature changing apparatus; network circuit means for controlling said controlling means, said network circuit comprising a pair of power terminals and a plurality of parallel branches connected between said terminals; a first branch including a resistance element having a movable tap thereon; a second branch including a tap connected to said movable tap of the first branch, a temperature responsive resistance element responsive to the heat supply, and a first and second impedance means connected in parallel; a third branch including a first and second switch means connected in parallel, and a temperature responsive resistance responsive to conditions indicative of the need of heat, said first switch means being effective to render said network circuit means inoperative when a condition indicative of the need of operation of said temperature changing apparatus is above a predetermined value; and said second switch means is open; a night set-back means selectively shunting said first impedance means; morning pick-up means for selectively shunting said second impedance means; and timer motor means for driving said night setback means, said morning pickup means, and said second switch.

3. In temperature control apparatus, means for controlling temperature changing apparatus; network circuit means for controlling said controlling means, said circuit comprising a pair of terminals and a plurality of parallel circuits connected between said terminals; a first circuit including an impedance means having a movable tap thereon; a second circuit including a tap connected to said movable tap, an impedance means variable in response to the output of said temperature changing apparatus, and a circuit whose impedance is varied in response to night set-back means and morning pickup means; a third circuit including a pair of switch means connected in parallel, an output tap, and impedance means variable in response to the outside temperature indicative of the need of operation of said temperature changing apparatus; circuit connection means connecting said output tap to said means for controlling temperature changing apparatus; and timer means arranged to adjust said night set-back means, said morning pick-up means, and one of said switch means so that during a predetermined period of operation the other of said switch means can render said control apparatus inoperative when the outside temperature is above a predetermined value.

4. In a temperature control apparatus for controlling temperature changing apparatus; network circuit means; relay means adapted to control the temperature changing apparatus; and means connecting said network circuit means to said relay means; said circuit means including first temperature responsive means responsive to outdoor temperature, second responsive means responsive to indoor temperature, time responsive switch means for changing the effect of said aforementioned responsive means on the temperature changing apparatus, and temperature responsive switch means associated with said first mentioned switch means for rendering said temperature changing apparatus inoperative.

5. In control apparatus for controlling the operation of heat furnishing apparatus; circuit means; relay means for controlling the heat furnishing apparatus; and connection means connecting said circuit means in controlling relation to said relay means; said circuit means including, first means responsive to outdoor temperature, second means responsive to the output of the heat furnishing means, said first and second means having a first predetermined relation to said circuit means so that for a particular outdoor temperature the heat furnishing means has a certain output, time responsive means adapted to modify said relation between said first and second responsive means, and temperature responsive means effective to render said heat furnishing means inoperative upon a predetermined temperature existing whenever said time responsive means has modified said relation between said first and second responsive means.

6. In temperature control apparatus, a balanceable electrical network circuit, relay means, temperature changing apparatus, means connecting said network circuit, said relay means, and said temperature changing apparatus in the order named, said network circuit comprising means responsive to outdoor temperature, means responsive to indoor temperature, switch means for rendering said temperature changing apparatus ineffective when the outdoor temperature is above a selected value, time operated switch means for rendering said first mentioned switch means ineffective so that during a predetermined time said temperature changing apparatus is controlled by said network circuit indepedent of said first mentioned switch means.

7. In temperature control apparatus, a balanceable electrical network circuit, relay means, temperature changing apparatus, means connecting said network circuit, said relay means, and said temperature changing apparatus in the order named, said network circuit comprising means responsive to outdoor temperature, means responsive to heating load, switch means responsive to outdoor temperature for rendering said network circuit ineffective when the outdoor temperature is above a predetermined value, and morning pick-up circuit means for changing the relation between said means responsive to outdoor temperature and means responsive to indoor temperature, and timer motor means for controlling another switch means connected in parallel with said first mentioned switch means and said morning pick-up circuit means.

8. In control apparatus, a balanceable electrical network circuit; relay means; condition changing means; and means connecting said network circuit, said relay means and said condition changing means in the order named, said network circuit comprising, means responsive to a first condition, means responsive to a second condition switch means responsive to said first condition for rendering said condition changing means ineffective when the first condition exceeds a predetermined value and further switch means associated with said first mentioned switch means for periodically rendering it ineffective.

9. In control apparatus, a balanceable electrical network circuit, relay means; condition changing means; and means connecting said network circuit, said relay means and said condition changing means in the order named, said network circuit comprising, means responsive to a first condition, means responsive to a second condition, and switch means responsive to said first condition for rendering said condition changing means inoperative when said first condition exceeds a predetermined value; and timer operated switch means for selectively rendering said switch means ineffective.

10. In temperature control apparatus, control means, temperature changing means, first responsive means responsive to outside temperature, second responsive means responsive to inside temperature, means connecting said responsive means to said control means so that said control means will control said temperature changing means in response to the relation of said outside and inside temperature, night set-back means for altering the relation of said first and second responsive means from a first value to a second value, and means responsive to outside temperature for rendering said temperature changing means ineffective when said relation is of a second value.

11. In temperature control apparatus, control means, temperature changing means, first responsive means responsive to outside temperature, second responsive means responsive to inside temperature, means connecting said responsive means to said control means for controlling said temperature changing apparatus in response to the relation of said outside and said inside temperature, morning pick-up means for altering the relation of said first and second responsive means from a first value to a second value, and temperature responsive means responsive to outside temperature for selectively rendering said temperature changing means ineffective when said relation is of a second value.

References Cited in the file of this patent

UNITED STATES PATENTS

| | | |
|---|---|---|
| 2,236,624 | Littwin | Apr. 1, 1941 |
| 2,366,500 | Eastin | Jan. 2, 1945 |
| 2,366,501 | Gille | Jan. 2, 1945 |